April 18, 1967 — N. S. BLACKMAN — 3,314,499
INSTRUMENT FOR QUANTITATING SOUND INTENSITIES
Filed Sept. 1, 1965 — 2 Sheets-Sheet 1
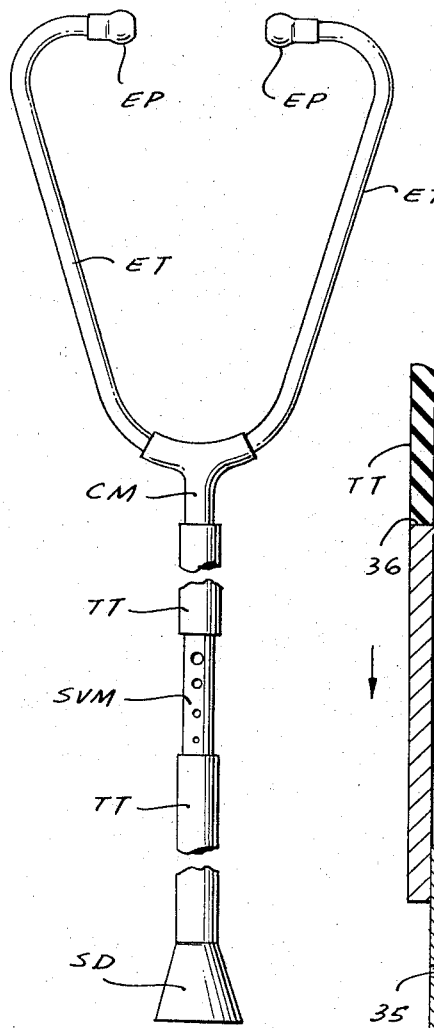
FIG.1
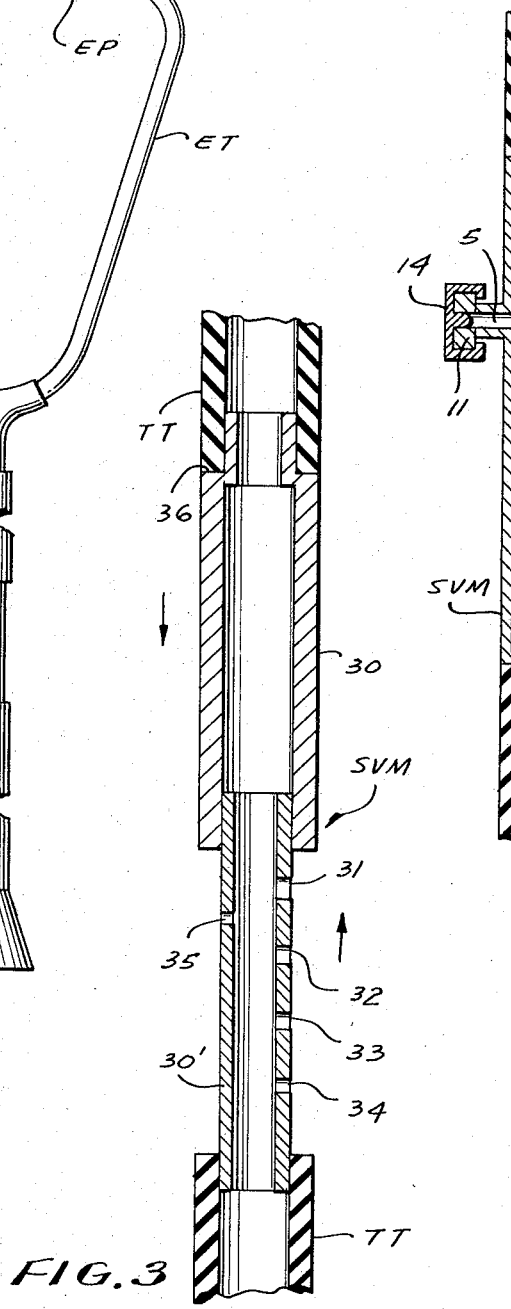
FIG.2
FIG.3
INVENTOR.
Norman S. Blackman
BY
Michael J. Striker

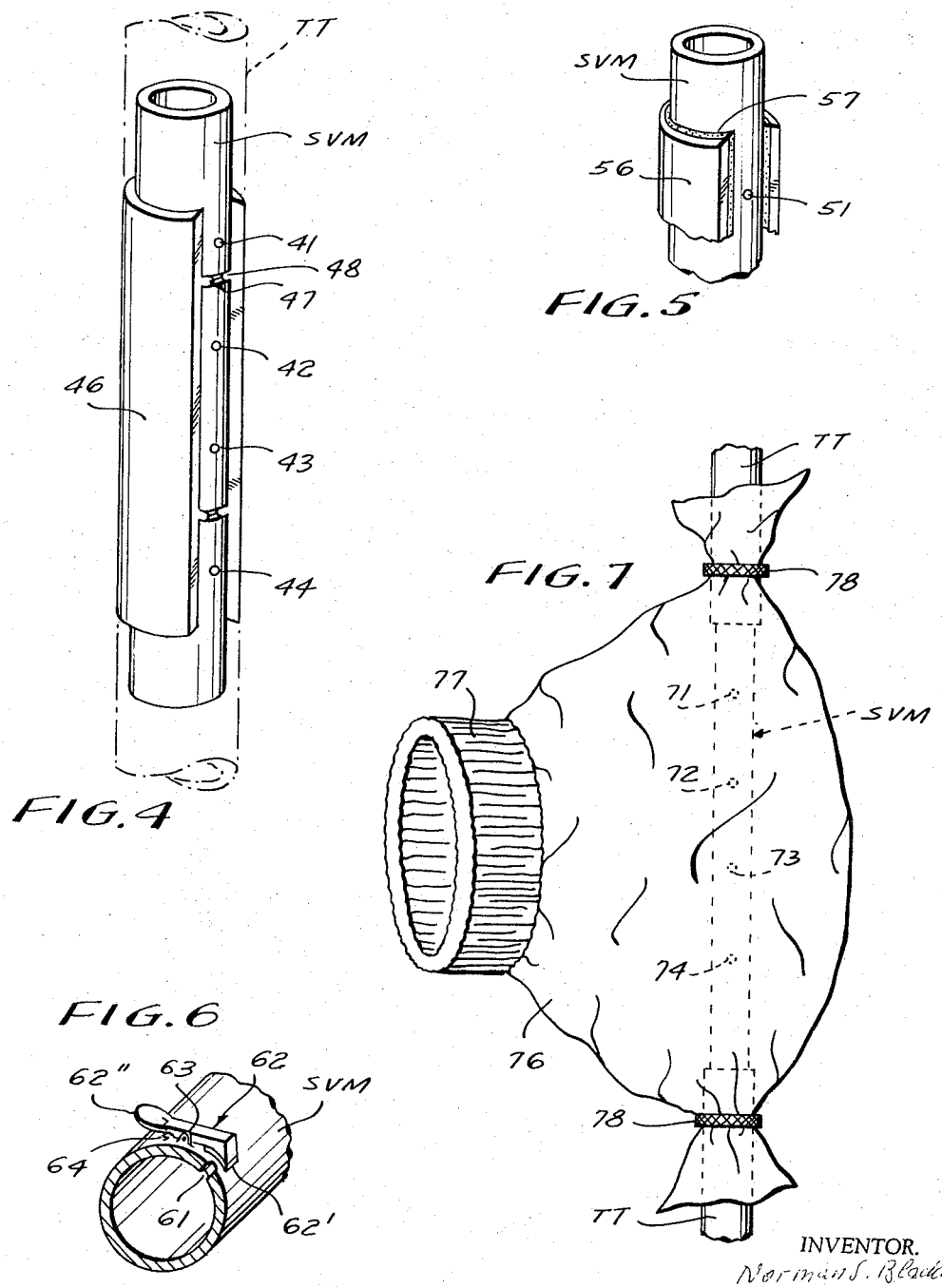

United States Patent Office 3,314,499
Patented Apr. 18, 1967

3,314,499
INSTRUMENT FOR QUANTITATING SOUND INTENSITIES
Norman S. Blackman, 2056 81st St., Brooklyn, N.Y. 11214
Filed Sept. 1, 1965, Ser. No. 484,323
12 Claims. (Cl. 181—24)

The present invention concerns a sound detecting instrument. More specifically, the invention relates to a stethoscope. Still more specifically, the invention relates to a stethoscope which is particularly adapted for the measurement of heart murmurs and heart sounds according to a predetermined scale of loudness or intensity.

Medical science has come to recognize that heart murmurs are frequently present in persons whose hearts are entirely healthy. On the other hand, heart murmurs also are generally a reliable indicator of the presence of defects of the heart. The distinction between so called "innocent" heart murmurs and "organic" murmurs which indicate actual defects of the heart is frequently based on the loudness or intensity of the murmur. According to the most widely adopted system of grading heart murmurs the latter are evaluated according to a scale of sound intensity which ranges from 1 to 6. Thus, a grade 1 murmur is considered to be the faintest murmur which can be distinctly heard, generally after a few seconds of concentrated auscultation. A grade 2 murmur is considered a slight murmur which is immediately apparent. Grade 3 and 4 murmurs are "intermediate murmurs." A grade 5 murmur is the loudest murmur which is still inaudible when the stethoscope is removed from the chest of a patient, and grade 6 is described as an extremenly loud murmur which can be heard even when the stethoscope is just removed from the chest wall. In accordance with this scale it has become common practice to identify the intensity or loudness of a heart murmur by designating it 1/6, 2/6, 3/6, 4/6, 5/6, or 6/6 in case of the loudest or most severe murmur.

It will be readily evident that with this system the classification as to intensity of a murmur must necessarily be subjective, since it is determined by the state of hearing of the examing physician and by his interpretation of the meaning of such terms as "intermediate murmur." At present there is no objective basis of reference for physicians to agree between themselves on the loudness of a murmur at a given time—nor to compare the changes in loudness of a particular murmur from time to time.

Although this system has been found to be of value to specially trained physicians, it cannot provide the degree of accuracy required by modern medical science. It is therefore clearly desirable to provide a way which permits a more objective grading of heart murmurs than heretofore possible.

In accordance with what has been said before, it is an object of the invention to provide a means of detecting and grading heart murmurs in a more objective manner than has been possible heretofore.

A more specific object of the invention is to provide a stethoscope with which such grading of heart murmurs can be carried out.

Still a more specific object of the invention is to provide a stethoscope for the above-described purpose and incorporating a means for quantitating the differences in the intensity of heart murmurs in various patients at a given time, and the same murmur in a given individual from time to time and under different circumstances.

Yet a more specific object is to provide a stethoscope of the type described which is calibrated according to a predetermined scale of intensity.

The principle behind the known stethoscope is, of course, the fact that sound will be transmitted through the sound detecting tube of the instrument and through the ear pieces connected therewith. If, now, a small leak is provided in the tubing anywhere along the path of the sound, then there is a considerable loss in the loudness of the sound transmitted to the ear of the physician. The invention is based on the realization that variable adjustment in the amount of leakage of sound will result in a quantitative loss of intensity of the sound transmitted to the ears, this loss being determined by the amount of leakage which is provided at any given time.

This can also be stated as follows:

The loudness or intensity of sound is measured in terms of sound pressure per unit of area and may be expressed in dynes per sq. cm. Thus the loudness of a sound can be determined by quantitating the degree of sound pressure emanating from the source. This in turn can be measured by determining the amount of dissipation of the sound pressure required to reduce this pressure from its maximum to zero. The amount of reduction necessary to reduce the sound pressure to zero is a direct function of the loudness of the original sound. This, then, can be used to quantitate the loudness of heart sounds and heart murmurs.

In my invention I have provided a quantitative means of progressively decreasing transmitted sound pressure in a sound conducting air system—in this case the stethoscope—by providing the means for specific quantities of leakage of the sound pressure from the closed system to the ambient air. This is accomplished by providing small holes, of calculated area, in the closed system which can be opened to permit escape of the pressure to the ambient air. These leak holes may be serially and progressively opened to permit a specific increase in the amount of leakage of the sound pressure until the point is reached when the pressure is reduced to zero. Measurement of the quantity of sound pressure leakage required then becomes a quantitative measurement of the loudness of the original source of sound, e.g. the heart.

In accordance with the above-stated objectives and with the principle as mentioned, one embodiment of my invention includes in a sound detecting instrument, particularly a stethoscope, the provision of sound detecting means, sound receiving means which is remote from the sound detecting means, elongated sound transmitting means which connects the detecting means with the receiving means, and means for selectively varying the intensity of sounds transmitted through the sound transmitting means to the receiving means. This last provision serves as a method for measuring or quantitating the intensity of sound.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

FIG. 1 is a view of a stethoscope embodying the invention;

FIG. 2 is a partial sectional view in longitudinal direction through a stethoscope embodying my invention;

FIG. 3 is a view similar to that of FIG. 2 and shows a different embodiment of the invention;

FIG. 4 is a perspective view of a modified embodiment of the invention;

FIG. 5 is a perspective partial view of another modified embodiment;

FIG. 6 is another perspective view, partly sectioned, of yet a further embodiment of the invention; and FIG. 7 is a perspective view of still another embodiment of the present invention.

Discussing firstly FIG. 1, it will be seen that there is shown there a stethoscope which includes a sound detecting means SD and a sound transmitting tube TT whose one end is connected to the sound detecting means SD and whose other end is connected to a connecting means CM in the form of a conventional Y-connector to which there are also connected two ear tubes ET which at their free ends carry ear pieces EP adapted to be inserted into the ear of a physician. The sound transmitting tube TT is provided with a portion SVM which represents the sound varying means of my invention.

The invention will become more readily understandable from a consideration of the embodiment shown in FIG. 2. As will be evident there the sound transmitting tube TT is provided in two parts which are connected together by my sound varying means SVM which is constructed basically in the form of a tubular section of any suitable material, such as metal or plastic. The tubular sound varying means SVM is provided at its opposite ends with a decreased external diameter so as to form thereon respective shoulders 6 surrounding extensions of the tubular means SVM which are adapted to be inserted into the tube TT so that the latter may abut with its endfaces against the respective shoulders 6. The portions of the tube TT are thus frictionally connected with the means SVM. Tubular means SVM is formed with five openings 1, 2, 3, 4, and 5. In the embodiment of FIG. 2 the tubular means SVM is formed with five projections extending outwardly from its outer peripheral surface and carrying at their outermost ends respective flanges 7, 8, 9, 10 and 11. The openings 1-5 are provided in the form of bores passing through the flanges and the projections, and communicating with the interior of the tubular means SVM. It will be seen from the drawing that four of the projections are located on one side of the tubular means SVM whereas the fifth projection is arranged diametrically opposite the other four. This arrangement is chosen because the openings 1-5 are to be selectively closed off by the finger tips of an examining physician, and it will be obvious that as the hand is placed about the tubular means SVM, the thumb will be located on the side opposite the openings 1-4. This mode of closing off the openings 1-5 is also the reason for the provision of the flanges 7 which serve to provide a flat surface for the fingertips to rest on. A first spring clip 12 is provided which is of a length to cover the four openings 1-4 and is designed to be clamped to the flanges 7-10. Clip 12 is provided with a plurality of projections 13 which, when the clip 12 is clamped onto the flanges 7-10, will enter into the openings 1-4 so as to reliably close the same. This provision is made to permit use of a stethoscope incorporating the present invention even when such stethoscope is not to be utilized for detection or grading of heart murmurs. Of course, it will be obvious that the clip 12 need not be of the spring type which can be clamped onto the flanges, but can be of magnetic material if the tubular means SVM is metallic. A clip 14, similar to clip 12 but smaller, is provided for the single flange 11 of opening 5.

Operation of the inventive arrangement will be clear from what has been said before. As the physician listens to the heart of a patient he may initially close off all of the openings 1-5 with his fingers. As each finger is removed from its respective opening, the total area of the sound leak to the outside is increased by a specific quantity, resulting in a corresponding decrease by a specific quantity in the loudness of the sound which is being transmitted to the ear.

Thus, if a murmur can just be heard when all openings are covered, it is designated as a grade 1/6 murmur corresponding roughly to the scale of intensity of murmurs which is now in general use. In other words, a murmur which can just be heard with all of the openings covered would be the faintest murmur detectable. If the murmur disappears when the physician removes a finger from the first opening, i.e. opening 4, then it will be confirmed as a grade 1/6 murmur. If it is still audible after opening 4 is uncovered but disappears after the second opening i.e. opening 3, is uncovered, it will be designated as a grade 2/6 murmur, and so on. If a murmur is still audible when all five openings are uncovered it is considered to be a grade 6/6 murmur, that is the loudest and most severe murmur on the scale. Thus, the present invention eliminates much of the subjectivity in evaluating the intensity of heart murmurs which has characterized the previous approach to this problem. In actual use, the openings will normally be uncovered serially, that is, successively in a given order starting with opening 4 and ending with opening 1, and finally opening 5 as the last.

Turning now to FIG. 3, it will be seen that this figure shows a modification of the invention. The openings 31-35 in this figure are provided directly in the circumferential wall of the sound varying means SVM, the projections and flanges 7-11 having been dispensed with. The reason for this is that in the embodiment shown in FIG. 3 the sound varying means consists of two sections 30 and 30' of which the section 30' is slidingly received within the section 30, as indicated by the oppositely directed arrows. This, it will be understood, eliminates the need for such cover devices as the clips 12 and 14, so that the physician when he is not using the stethoscope for purposes of detecting and grading heart murmurs, will simply slide the section 30' into the section 30 and can then use the stethoscope in the conventional manner for other examinations.

In the embodiment shown in FIG. 4 the sound varying means SVM is provided with one or more circumferential grooves 47 in which the complementary ridges 48 of a cover means 46 engage. The cover means 46 surrounds the tubular sound varying means SVM over almost the entire circumferential area thereof, and is provided with necessary cutouts through which the fingers of the physician may engage the openings 41-45 (opening 45 not shown in this figure). It will be evident that the cover means 46 may be rotated about the tubular sound varying means SVM so that the openings 41-45 may be closed off whenever the stethoscope incorporating the invention is being used for purposes other than those connected with the invention.

FIG. 5 shows a modification of the cover means in which the cover means 56 is of the clip-on type and is lined with a suitable material, such as foam rubber, felt, or the like. The cover 56 may, of course, be of any material which permits it to be placed onto the sound varying means 5 in frictional engagement, such as metal, plastic or other suitable materials. When the stethoscope incorporating the invention is being used for identifying heart murmurs, the cover means 56 is either completely removed from the sound varying means SVM or is clipped thereto in such a position as to leave the opening 51 and the non-illustrated additional four openings unobstructed.

A further modification of the invention is illustrated in FIG. 6, where the sound varying means SVM will be seen to be provided with keys (only key 62 shown), somewhat in the manner of wood-wind instruments. Specifically, the keys 62 each comprise a closure portion 62' which is adapted to close off the opening 61, and an actuating portion 62" secured to, or integral with the closure portion 62'. The entire key is pivotable about a pivot 63 and the closure portion 62' is normally urged into contact with the outer surface of the sound varying means SVM and thereby into closure position for the opening 61, by a spring or other biasing means 64. It will be clear how the arrangement of FIG. 6 operates. The physician depresses the actuating portion 62" of each key 62, thereby lifting the closure portion 62" away from the respective opening against the urging of the biasing means 64. As he releases pressure of his fingers on the actuating portion 62', the closure portion 62' will return into its closing position in which the opening 61 will be sealed off.

FIG. 7, finally, shows yet another modification of the invention in that it provides a means for shutting out ambient noise. Specifically, the sound varying means SVM with its openings 71–74, and the opposed opening, which is not shown, is enclosed in a sleeve or bag 76 which may be made of any suitable material, but is preferably constituted of a highly sound-absorbing fabric such as felt or velvet. The glove or sleeve 76 is provided with an opening through which the hand of the physician may be inserted and this opening is closed by a suitable means, such as a knitted wristlet 76 which will engage the wrist of a hand inserted into the sleeve 76. Since in most cases it will not be desirable to leave the sleeve on the stethoscope at all times, it will be seen that the respective openings through which the sound varying means SVM is inserted into the sleeve 76 may be selectively closed off by clamps or other suitable means 78. Thus, when the sleeve is not needed or desired, the clamps 78 are released and the sleeve is removed. It will be obvious, of course, that the sound varying means SVM in this embodiment can be provided with the various arrangements for closing off the openings as shown in the preceding figures.

The invention thus having been described it is believed that it will be clear that there is now provided a simple, but very efficient means of grading heart murmurs one a predetermined scale and in a manner which is much more objective than has heretofore been possible. Of course, it should be noted that the present invention can be readily adapted for other purposes having to do with measuring the relative loudness or intensity of a given sound.

It will be understood that each of the elements described above, or two or more together, may also find a useful application in other types of sound detecting instruments differing from the type described above.

While the invention has been illustrated and described as embodied in sound detecting instrument, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a sound detecting instrument, particularly a stethoscope, sound detecting means; sound receiving means; elongated sound transmitting means connecting said detecting means with said receiving means; sound quantitating means, for selectively varying the intensity of sounds transmitted through said sound transmitting means to said receiving means, said sound quantitating means comprising a tubular portion arranged in said transmitting means and provided with a plurality of longitudinally spaced apertures of differing cross-sectional areas, so that blocking and unblocking of any aperture results in a variation of predetermined scope in the intensity of sound transmitted, whereby such sounds may be quantitated by selective blocking and unblocking of said apertures; and means associated with said tubular portion for closing said apertures, when desired.

2. In a sound detecting instrument, particularly a stethoscope, sound detecting means; sound receiving means; elongated sound transmitting means connecting said detecting means with said receiving means; sound quantitating means for selectively varying the intensity of sounds transmitted through said sound transmitting means to said receiving means, said sound quantitating means comprising a tubular portion arranged in said transmitting means and provided with a plurality of longitudinally spaced apertures of differing cross-sectional areas, so that blocking and unblocking of any aperture results in a variation of predetermined scope in the intensity of sounds transmitted, whereby such sounds may be quantitated by selective blocking and unblocking of said apertures; and means associated with said tubular portion for closing said apertures, when desired.

3. In a sound detecting instrument, particularly a stethoscope, sound detecting means; sound receiving means; elongated tubular sound transmitting means including a pair of spaced flexible tubes respectively connected to said detecting means and said receiving means; means, including a rigid tubular member provided with longitudinally spaced apertures and connecting said flexible tubes, arranged in said sound transmitting means for selectively varying the intensity of sounds transmitted through said transmitting means to said receiving means; and means associated with said rigid tubular member for closing said apertures, when desired.

4. In a sound detecting instrument, particularly a stethoscope, sound detecting means; sound receiving means; elongated tubular sound transmitting means, including a pair of spaced flexible tubes respectively connected to said detecting means and said receiving means for conducting sound from the former to the latter; means for selectively varying the intensity of sounds transmitted through said transmitting means to said receiving means, said means including a rigid tubular member connecting said flexible tubes with one another and having a circumferential wall formed with a plurality of longitudinally spaced apertures of differing cross-sectional areas communicating with the atmosphere whereby, when said apertures are unblocked, the intensity of sound transmitted through said transmitting means is reduced; and means associated with said rigid tubular member for closing said apertures, when desired.

5. In a sound detecting instrument, particularly a stethoscope, sound detecting means; sound receiving means; elongated tubular sound transmitting means, including a pair of spaced flexible tubes respectively connected to said detecting means and said receiving means for conducting sound from the former to the latter; means for selectively varying the intensity of sounds transmitted through said transmitting means to said receiving means, said means including a rigid tubular member connecting said flexible tubes with one another and having a circumferential wall formed with a plurality of longitudinally spaced apertures of differing cross-sectional areas communicating with the atmosphere and adapted to be selectively blocked and unblocked whereby, when said apertures are unblocked, the intensity of sound transmitted through said transmitting means is reduced; and means associated with said rigid tubular member for closing said apertures, when desired.

6. In a sound detecting instrument, particularly a stethoscope, sound detecting means; sound receiving means; elongated tubular sound transmitting means, including a pair of spaced flexible tubes respectively connected to said detecting means and said receiving means for conducting sound from the former to the latter; means for selectively varying the intensity of sounds transmitted through said transmitting means to said receiving means, said means including a rigid tubular member connecting said flexible tubes with one another and having a circumferential wall formed with a plurality of longitudinally spaced apertures communicating with the atmosphere and adapted to be selectively blocked and unblocked whereby, when said apertures are unblocked, the intensity of sound transmitted through said transmitting means is reduced; and means associated with said rigid tubular member for closing said apertures, when desired.

7. In a sound detecting instrument, particularly a stethoscope, sound detecting means; sound receiving means; elongated tubular sound transmitting means, including a pair of spaced flexible tubes respectively connected to said detecting means and said receiving means for conducting sound from the former to the latter; means for selectively varying the intensity of sounds transmitted through said transmitting means to said receiving means, said means including a rigid tubular member connecting said flexible tubes with one another and having a circumferential wall formed with a plurality of longitudinally spaced apertures communicating with the atmosphere and each adapted to be selectively blocked and unblocked whereby, when said apertures are unblocked, the intensity of sound transmitted through said transmitting means is progressively reduced in proportion to an increase in the number of unblocked apertures; and means associated with said rigid tubular member for closing said apertures, when desired.

8. In a sound detecting instrument, particularly a stethoscope, sound detecting means; sound receiving means; elongated tubular sound transmitting means, including a pair of spaced flexible tubes respectively connected to said detecting means and said receiving means for conducting sound from the former to the latter; means for selectively varying the intensity of sounds transmitted through said transmitting means to said receiving means, said means including a rigid tubular member comprising a first portion connected to one of said tubes and a second portion connected to the other of said tubes, one of said portions being provided with longitudinally spaced apertures communicating with the atmosphere, said one portion being slidably receivable within the other portion so that said apertures are thereby each adapted to be selectively blocked and unblocked whereby, when said apertures are unblocked, the intensity of sound transmitted through said transmitting means is progressively reduced in proportion to an increase in the number of unblocked apertures; and means associated with said rigid tubular member for closing said apertures, when desired.

9. An instrument as defined in claim 8; and further comprising a cover member surrounding said one portion over part of the circumference thereof in contact with the circumferential wall of said one portion, said cover member being provided with at least one cut-out adapted to be juxtaposed with said apertures and being rotatable relative to said one portion whereby, when said apertures are to be uncovered, said cover member is rotated until said cut-out registers with said apertures.

10. An instrument as defined in claim 8; and further comprising individual cover means, each cooperating with one of said apertures and including a pivotally arranged blocking portion adapted to cover the respective aperture, biasing means for resiliently biasing said blocking portion against said one portion of said tubular member in a position blocking said aperture, and a lifting portion cooperating with said blocking portion whereby the latter is pivoted out of said blocking position in response to pressure exerted on said lifting portion.

11. In a sound detecting instrument, particularly a stethoscope, sound detecting means; sound receiving means; elongated tubular sound transmitting means, including a pair of spaced flexible tubes respectively connected to said detecting means and said receiving means for conducting sound from the former to the latter; means for selectively varying the intensity of sounds transmitted through said transmitting means to said receiving means, said means including a rigid tubular member connecting said flexible tubes with one another and having a circumferential wall formed with a plurality of longitudinally spaced apertures communicating with the atmosphere and each adapted to be selectively blocked and unblocked whereby, when said apertures are unblocked, the intensity of sound transmitted through said transmitting means is progressively reduced in proportion to an increase in the number of unblocked apertures; noise-insulating means for preventing entry of external noise through said apertures into said transmitting means; and means associated with said rigid tubular member for closing said apertures, when desired.

12. An instrument as defined in claim 11 wherein said noise-insulating means includes bag means secured to said flexible tubes at either end of said tubular member so that said tubular member is received within said bag means, said bag means having an opening through which a human hand may be inserted, and said opening being surrounded with elastic means provided on said bag means for elastically engaging the wrist above said hand so as to prevent entry of external noise through said opening.

References Cited by the Examiner

UNITED STATES PATENTS

| | | | |
|---|---|---|---|
| 448,627 | 3/1891 | Benjamin | 181—24 |
| 654,906 | 7/1900 | Marsh | 181—24 |
| 2,363,175 | 11/1944 | Grossman | 179—107 |
| 2,389,868 | 11/1945 | Olson | 181—24 |
| 2,390,794 | 12/1945 | Knight | 179—1 |

FOREIGN PATENTS 28,534    1913    Great Britain.

STEPHEN J. TOMSKY, *Primary Examiner.*

RICHARD B. WILKINSON, *Examiner.*